United States Patent [19]

Bernicky

[11] 4,222,175
[45] Sep. 16, 1980

[54] ALIGNMENT SIGHT FOR HAND DRILLS

[76] Inventor: Joseph Bernicky, 7931 Austin St., Schererville, Ind. 46375

[21] Appl. No.: 973,516

[22] Filed: Dec. 26, 1978

Related U.S. Application Data

[63] Continuation-in-part of Ser. No. 850,446, Nov. 10, 1977, abandoned.

[51] Int. Cl.³ .......................... G01L 15/00; F41G 1/00
[52] U.S. Cl. .......................................... 33/263; 33/286
[58] Field of Search ................. 33/233, 259, 260, 263, 33/264, 266, 286, 334

[56]  References Cited

U.S. PATENT DOCUMENTS

| 2,407,845 | 9/1946 | Nemeyer | 33/286 |
| 2,822,615 | 2/1958 | Durst et al. | 33/286 |
| 3,026,618 | 3/1962 | Vardara | 33/259 |
| 3,906,640 | 9/1975 | Sosa | 33/263 |

FOREIGN PATENT DOCUMENTS

| 162855 | 9/1905 | Fed. Rep. of Germany | 33/233 |
| 549091 | 4/1932 | Fed. Rep. of Germany | 33/334 |
| 158881 | 5/1957 | Sweden | 33/233 |
| 408551 | 2/1966 | Switzerland | 33/286 |

Primary Examiner—Richard R. Stearns
Attorney, Agent, or Firm—Robert D. Farkas

[57] ABSTRACT

An alignment sight for hand drills utilizes a pair of sights, preferably a fixed tool, a unitary sheet, for mounting onto the exterior surface of an electrical hand tool of the hand drill variety. The sights are arranged so that the sight line extends perfectly parallel to the longitudinal axis located in the center of the chuck of the hand drill. In use, a user marks a spot on the work piece a fixed distance from the center of the hole to be drilled. Positioning the tip of the drill bit at the location of the hole, and locating the drill bit so that it extends substantially normal to the plane of the work piece, permits the user to maintain the sights aligned with the mark thereby forever maintaining the longitudinal axis of the drill bit perfectly normal to the surface of the work piece, providing thereby, a hole extending at right angles to the surface of the work piece.

6 Claims, 4 Drawing Figures

ALIGNMENT SIGHT FOR HAND DRILLS

BACKGROUND OF THE INVENTION

1. The Field Of The Invention

This application is a continuation-in-part of prior U.S. application Ser. No. 850,446, now abandoned, filed on Nov. 10, 1977.

This invention relates to sighting devices and more particularly to that class of apparatus adapted to be attached to hand tools facilitating the accurate and convenient use thereof.

2. Description Of The Prior Art

The prior art abounds with hand tool leveling or positioning devices. U.S. Pat. No. 341,378 issued on May 8, 1886, to W. E. Gwyer teaches a spirit level for boring bits, employing a hook like pair of arms adapted to slidably engage the exterior surface of the smooth portion of a boring bit or drill bit. The other end of the hook like arms are weighted with a weight such that the arms are constantly maintained in an upright position. The free end of the hook like arms adjacent the hook-like portions thereof are secured to a spirit level whose level line extends substantially parallel to the longitudinal axis of the boring bit. In use, such device maintains the boring bit in a horizontal position by visually sighting the bubble within the spirit level. Such apparatus is useful but is useful for drilling holes whose longitudinal axis must be maintained in a horizontal frame. The Gwyer teaching fails to provide a method for drilling holes which causes the longitudinal axis of such holes to reside perpendicular to the surface of the work piece disregarding the position of the work piece while being drilled.

U.S. Pat. No. 3,864,839 issued on Feb. 11, 1973, to L. J. Wolf describes a power hand drill having a device for assisting its operator in actively positioning its bit horizontally for drilling vertical surfaces and vertically for drilling horizontal surfaces. The positioning-assisting device comprises a circular bubble type level mounted for selected securement to surfaces of the drill housing parallel and normal respectively to the drill axis. The Wolf apparatus permits the drill bit to be positioned either perpendicular or horizontally, but fails to provide a means in which the apparatus may be positioned at any desired angle relative to a vertical line or a horizontal line when the work piece is likewise positioned at any relative angle thereto.

U.S. Pat. No. 3,664,032 issued May 23, 1972, to C. A. Tompkins discloses a tool for working on an object positioned at an angle relative to a reference plane, such tool includes a level indicator to indicate the angular relationship of said tool to the object and to the reference plane by utilizing a disc-like spirit level mounted to a gymbal selectively positioned to the surface of the tool. Thus, the tool may be positioned relative to the reference plane but requires that the work piece be positioned at a measurable angle such that the tool may be operated at any angular relationship to the work piece.

SUMMARY OF THE INVENTION

A primary object of the present invention is to provide a device facilitating positioning a work tool at a given angular relationship relative to the plane of a surface of a work piece.

Another object of the present invention is to provide a tool which may be readily and conveniently attached to the surface of any type of hand tool.

Still another object of the present invention is to provide an alignment device which indicates that the hand tool is changing its angular relationship relative to the surface of the work piece while the hand tool is being moved about.

Yet another object of the present invention is to provide an alignment device which permits the work piece to be positioned at any angular relationship relative to a horizontal reference plane while being worked.

A further object of the present invention is to provide an alignment device which may be used with hand held work pieces as opposed to work pieces which must otherwise be maintained in a fixed position while being worked.

Still yet another object of the present invention is to provide an alignment device which is inexpensive to manufacture and totally simple in use.

Heretofore, when drilling a hole, utilizing an electrically operated drill, or any type of drill machine, the user was forced to sight the exterior surface of the drill bit and guess at the angle assumed thereby during the drilling operation relative to the surface of the work piece. Prior art devices relied heavily upon spirit levels to maintain the drill machine or the drill bit itself in a given position, either in a vertical plane or a horizontal plane. This required that the work piece itself be secured in such a manner that the surface thereof was maintained in a fixed location while being drilled because the drill machine itself was forced to be maintained in any fixed angular relationship relative to the surface of the earth. Accordingly, drilling operations on loose, unsecured work pieces was impossible unless the work pieces were locked into a given angular relationship relative to a fixed plane. Adjustable spirit levels have been utilized heretofore, but such devices also require the work piece to be secured while operated on by the hand tool. Furthermore, such work pieces have to be actively positioned and the angle of the spirit level set accurately in order to drill holes, or perform other operations, whereby the hand tool could be positioned at any preferential angular relationship relative to an exterior surface of the work piece.

The present invention contemplates these problems and solves them by utilizing an optical sight which in conjunction with the surface of the work piece permits the user to sight a target area, utilized for positioning the hand tool at any angular relationship desired relative to the exterior surface of the work piece. Thus, for example, holes may be drilled perpendicularly, or at any desired angle relative to the surface of the work piece. The present invention also provides for mounting to hand operated tools or portable tools whose exterior surfaces are other than flat, thereby enhancing the capability of adopting the present invention to a wide variety of portable tools.

These objects as well as other objects of the present invention will become more readily apparent after reading the following description of the accompanying drawings.

DESCRIPTION OF THE PREFERRED EMBODIMENT

Figure 1:
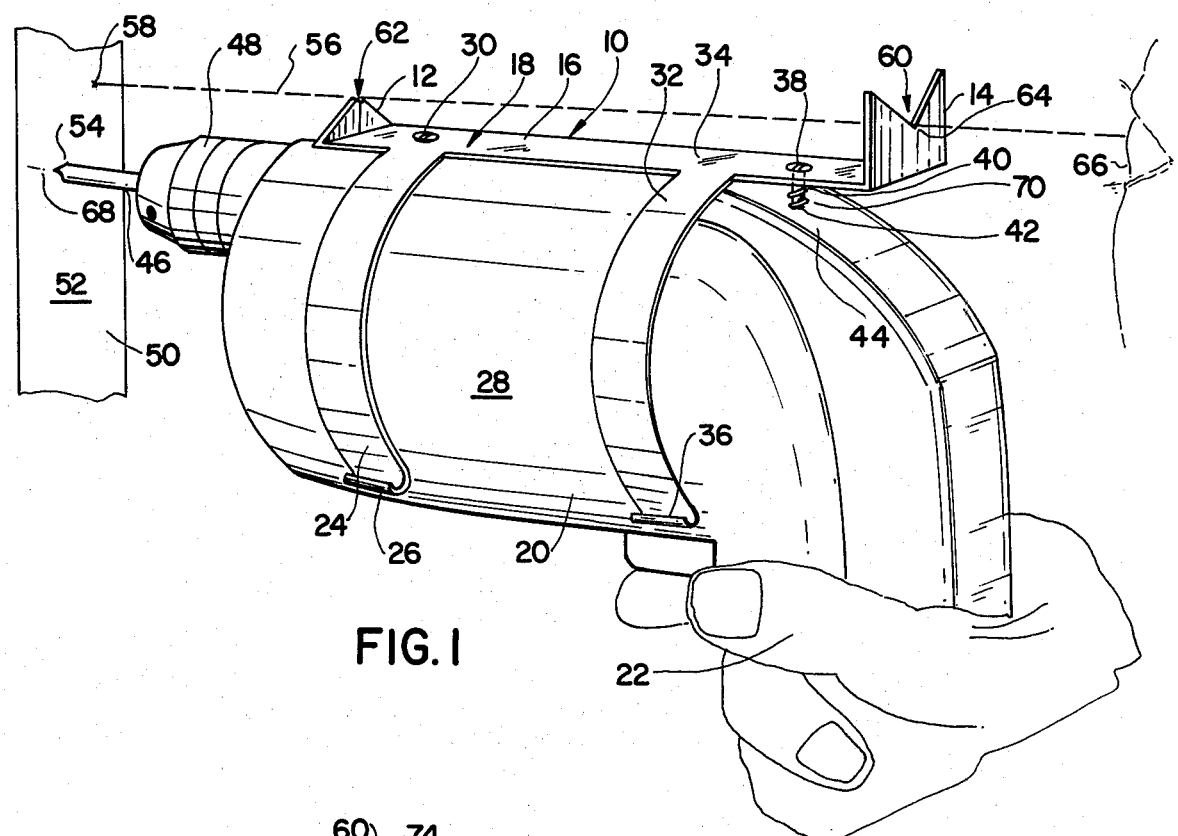
FIG. 1 is a perspective view of the present invention, shown secured to a hand held electrical drill.

The structure and method of fabrication of the present invention is applicable to a hand drill or other portable device. An elongated rigid sheet, preferably fabricated from a metallic material, such as steel, is provided having the ends thereof formed at right angles to the joining portions thereof, so as to have a substantially U-shaped cross section. The uppermost region of one leg is provided with a truncated shape such that the apex of the point is notched inwardly. The other leg is matched inwardly with a V-shaped notch whose apex is located exactly the same distance away from the joining portion of the U-shaped member as is the notch located in the other leg. At least a pair of openings are provided in the joining portion of the U-shaped member. In use, a bolt or other fastener is utilized to secure the present invention to an electrically operated drill by engaging an opening therein or by engaging a metallic strap whose shape is configured to engage the surface of the drill by a clamping action. Another strap, secured to the joining portion of the U-shaped member similarly employs a bolt-type fastener, or if desired may be riveted to the joining member. Both straps thus clampingly engage the barrel-like portion of the drill device aligning the joining member portion of the U-shaped sheet in direct parallel relationship with the longitudinal axis of the drill. Since some electrically operated portable drills do not have barrel-like exterior surfaces extending over a substantial portion of the length thereof, another bolt, threadingly engaged with the joining portion of the U-shaped member may be utilized such that the end of the bolt may contact a portion of the exterior surface of the drill. Rotating the bolt causes the U-shaped member to be positioned at any desired angle relative to the longitudinal axis of the chuck of the drilling tool. This scheme, as well as other similar adjustment devices, may be employed so that the present invention may be easily and quickly strapped on to existing hand held drilling machines without requiring modifying such machines. A spring, wound in helical form, disposed residing over the adjustable bolt, helps to maintain the joining member portion of the U-shaped member in any desired position, by overcoming the clamping forces of an adjacent strap, whereby such clamping forces tend to position the U-shaped member at a given location. The present invention facilitates operation by only marking, with a pencil point or otherwise, on the work piece, a sight point. No mirrors or specially darkened areas of work are required. Reflections such as obtained by compound sights, employing reflective surfaces, are eliminated. Loss of light intensity often experienced by utilizing reflective surfaces, even if clean, and especially if dirty, a common experience in woodworking operations, are eliminated. Further, the user simply and conveniently can adjust the removable inventive apparatus, to position same at a preferred angle of operation, such that the apparatus may be set up for one angle of operation, removed and replaced secured to the drill machine, as many times as is desired, without further adjustments being required on each installation or removal. The only time the user is required to adjust the angle adjustment feature, the bolt and spring mechanism, is when another angle of operation is required.

Sights may be fabricated having any desired configuration. An alternate embodiment may employ a pair of cross wires disposed residing within a circular plane located at each of the legs of the U-shaped member.

In use, the user first marks the work piece, whether or not clamped in a given position, with a pencil mark depicting the center of the location of the hole to be drilled. The user, by past measurement, has determined the distance separating the longitudinal axis of the chuck of the portable drill and the sight line passing through the sights located at both legs of the U-shaped member. If it is desired to drill a hole extending perpendicularly to the exterior surface of the work piece, the user then marks another pencil mark this distance away from the center of the hole to be drilled. The user then applies the tip of the drill bit, of any length or of any diameter, directly on the center of the mark depicting the location of the desired hole. Visual sighting along the sight axis of the device lining up both sights and the sight mark automatically positions the drill such that the longitudinal axis of the bit is positioned perpendicularly to the surface of the work. Alternatively, the user may desire to direct the axis of the hole to be drilled into the surface of the work piece at some angle other than 90 degrees. If such be the case, the user manually positions the drill bit tip on to the location of the work piece where the hole is to be drilled. Then, the hand drill is positioned at any preferred angle relative to the surface of the work piece. This may be accomplished by utilizing a protractor, hand drill guide, or the like. When the hand drill is so positioned, the user sights along the sights and marks the surface of the work piece at the intersection of the sight line and the exterior surface of the work piece. The apparatus utilized to angularly position the hand drill is then removed. The user may then drill the hole, maintaining at all times the sight line centered on the sight mark previously obtained. In so doing, the hand drill is maintained at the preferred angle relative to the surface of the work piece. Thus, a user may utilize the present invention for drilling holes so as to maintain a longitudinal axis of the drill bit at any desired angle relative to the surface of the work piece. This can be accomplished for any angle that the work piece is maintained during such a drilling operation. Furthermore, the user may remove the apparatus from the hand held machine at his convenience by simply grasping the drill machine in one hand and the present invention in the other and snappingly removing the clamping bands from the exterior surface of the drill machine. The adjustment screw is maintained in its preferred location ready for use in the next drilling operation requiring the use of the present invention. If the user is required to drill a large quantity of holes whose longitudinal axis extends at an angle other than 90 degrees from the surface of the work piece, the adjustment screw may be varied so as to position the present invention at a semi-permanent location.

Now referring to the figures and more particularly to the embodiment illustrated in FIG. 1 showing the present invention 10 having legs 12 and 14 disposed turned upwardly, and parallel spaced apart relationship, both being normal to adjoining portion 16, of generally U-shaped member 18. Hand held drill machine 20 is shown grasped by the hand 22 of the user. Strap or band 24 is provided having turned up end 26 adapted to clampingly engage exterior surface 28 of drill 20. Such strap may be fabricated from a steel possessing some spring-like properties. Turned up end 26 facilitates easy installation and removal on to surface 28 of drill machine 20. Bolt 30 is utilized to secure band 24 to joining portion 16 of U-shaped member 18. Band 32 is shown secured to joining member 16 utilizing rivet 34 therefore. Band 32 is also provided with an upturned end 36, similar to upturned end 26. Bolt 38 is shown having threads 40, threadingly engaged within a threaded hole located in joining member 16. End 42 of bolt 38 engages surface portion 44 of drill machine 20. Rotating bolt 38, causes end 42 thereof to move outwardly or inwardly towards joining member 16. This positions leg 14 at any preferred location relative to surface portion 44 of drill machine 20. Drill bit 46 is shown centered within chuck 48 of drill machine 20. Work piece 50 is shown having exterior surface 52 thereof engaging end 54 of drill bit 46. A hole, not shown, to be drilled within surface 52, is located adjacent end 54 of drill bit 46. Dotted lines 56 are shown intersecting a sight mark 58 positioned on surface 52 of work piece 50 and intersecting V-shaped notch 60 located on leg 14 and V-shaped notch 62 located at the end of leg 12. Notch 60 has apex portion 64 thereof engaging dotted lines 56. Triangularly shaped leg 12 has the apex of notch 62 similarly engaged with dotted lines 56. Eye 66 of the user intersects dotted lines 56, whereby such dotted lines simulate the sight line utilized when employing the present invention. The longitudinal axis of drill bit 46 is depicted by dotted lines 68. Dotted lines 56 and 68 are separated a given distance dependent upon the position of bolt 38. If bolt 38 is not employed at all, or if end 42 thereof is disposed located away from touching engagement with portion 44 of the surface of drill machine 20, then the distance separating dotted lines 56 and dotted lines 68 is determined solely by the position assumed by U-shaped member 18 and the clamping position of bands 24 and 32. If however, bolt 38 is employed, dotted lines 56 and dotted lines 68 may be skewed to one another such that mark 58 if maintained at the position shown would cause drill machine 20 to assume an angle other than shown. Thus, the apparatus may be adjusted to drill holes at any preferred angle, other than normal to surface 52 by utilizing bolt 38. When bolt 28 is turned within the threaded hole, then, sight 60, being one of the pair of sights comprising sight 60 and sight 62, will move inwardly or outwardly, relative to surface 44. In this fashion, sight 60 may be disposed further outwardly from the exterior surface of the drill machine than sight 62 or, a closer distance than sight 62, all dependent upon the number of turns utilized to adjust bolt 38. Spring 70, preferably having a helical shape, may be disposed wound about bolt 38 thereby facilitating easy repositioning of the angular relationship of dotted lines 56 and dotted lines 58 at the will of the user. In the event that dotted lines 56 and dotted lines 58 are parallel to each other, by adjustment of bolt 38, then the angle first assumed between dotted line 68 and the surface 52, will determine the angular location of the longitudinal axis of the hole, not shown, to be drilled within surface 52. Because the present invention may be clampingly removably secured to the drill machine 20, and because bolt 38, and the normalizing spring 70 secured therearound, may be removed from the drill machine at the same time that the present invention in its entirety is removed, the present invention, after being set up once, for a preferred angle of operation, relative to the longitudinal axis of the drill machine, may be repositioned onto the drill machine such that the device may be utilized to obtain holes positioned at the preferred angle without requiring further readjustment of the bolt 38, spring 70 combination, both used for adjusting parallax or non-parallax conditions of operation.

Figure 2:
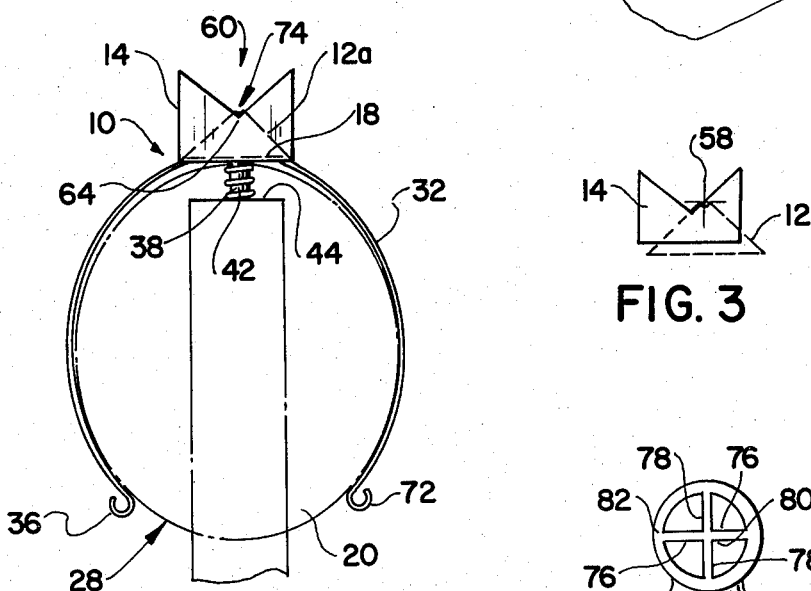
FIG. 2 is a rear elevation view of a portion of the apparatus shown in FIG. 1.

FIG. 2 illustrates held machine 20 on which band 32 is shown secured. Upturned edge 72, of band 32, is similar to upturned edge 36 facilitating conveniently moverable attachment to surface 28 of drill machine 20, of U-shaped member 18. U-shaped notch 60 is shown having apex portion 64 thereof aligned with the apex portion 74 of leg 12, as shown in FIG. 1, depicted by dotted line 12-a. Threaded bolt 38 is shown having end 42 thereof contacting surface portion 44 of drill machine 20.

Figure 3:
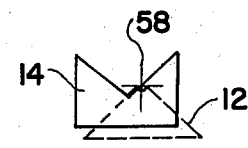
FIG. 3 is a rear view of the sight portions of the present invention shown in a misaligned condition.

FIG. 3 illustrates the ease in which leg 14 and leg 12 may be determined to be misaligned with mark 58 by visually peering therealong so as to align the sight portions of the legs to the mark.

Figure 4:
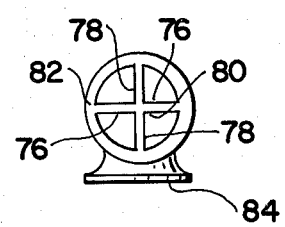
FIG. 4 is a side elevation view of an alternate embodiment of the sight portions of the present invention.

FIG. 4 illustrates an alternate embodiment of another sight type arrangement for either or both legs 12 and 14, shown in FIG. 1, employing hairlines 76 shown at right angles to hairlines 78 and intersecting at point 80. Frame portion 82 joins such hairlines, preferably fabricated from a fine metallic wire to a portion of a plate member 84, equivalent in function to joining member 16, shown in FIG. 1.

One of the advantages of the present invention is to provide a device facilitating positioning a work tool at a given angular relationship relative to the plane of a surface of a work piece.

Another advantage of the present invention is to provide a tool which may be readily and conveniently attached to the surface of any type of hand tool.

Still another advantage of the present invention is to provide an alignment device which indicates that the hand tool is changing its angular relationship relating to the surface of the work piece while the hand tool is being moved about.

Yet another advantage of the present invention is to provide an alignment device which permits the work piece to be positioned at any angular relationship relative to a horizontal reference plane while being worked.

A further advantage of the present invention is to provide an alignment device which may be used with hand held work pieces as opposed to work pieces which must other wise be maintained in a fixed position while being worked.

Still yet another advantage of the present invention is to provide an alignment device which is inexpensive to manufacture and totally simple in use.

Thus there is disclosed in the above description and in the drawings, an embodiment of the invention which fully and effectively accomplishes the objects thereof. However, it will become apparent to those skilled in the art, how to make variations, and modifications to the instant invention. Therefore this invention is to be limited, not by the specific disclosure herein, but only by the appending claims.

The embodiment of the invention in which an exclusive privilege or property is claimed are defined as follows:

1. An alignment sight for a hand drill, said hand drill having a chuck for receiving a drill bit therein, said drill bit defining a longitudinal axis when disposed clamped within said chuck, said alignment sight comprising an elongated rigid sheet, said sheet being disposed in a U-shape having a pair of legs joined together by a joining portion of said sheet, each leg of said pair of legs having an optically defined sight location thereon, a pair of sights, one of said pair of sights being disposed adjacent an end of said hand drill opposite the end thereof having said chuck thereon, each of said pair of sights including an opaque portion and a non-opaque portion, said sight location being disposed a fixed distance from said joining portion of said sheet, at least one band, said at least one band having ends, a portion of said at least one band fixedly secured to said joining portion, said pair of legs and said ends of said at least one band being disposed having said joining portion thereinbetween, said at least one band being configured so as to clampingly removably engage the exterior surface of a portable drill machine, whereby a point coincident with said opaque portion and said non-opaque portion of one of said pair of sights and another point coincident with said opaque portion and said non-opaque portion of the other of said pair of sights define a line, said adjoining portion having a threaded hole therein, a bolt, said bolt threadingly engaged with said threaded hole, one end of said bolt extending outwardly from said joining portion in a direction opposite to the location of said legs and directed towards said exterior surface, a helical spring, said helical spring being disposed located about said bolt, one end of said spring engaging said exterior surface of said drill machine, the other end of said spring engaging said joining portion, whereby turning said bolt disposes the axis of said line at a preferred angular relationship to said longitudinal axis by adjusting said line in and out of parallel relationship with said longitudinal axis when said at least one band is clampingly removably engaged on said exterior surface and by disposing said point coincident with said opaque portion and said non-opaque portion of one of said pair of sights a greater or lesser distance from said longitudinal axis than the other said point coincident with said opaque portion and said non-opaque portion of the other of said pair of sights.

2. The apparatus as claimed in claim 1 wherein one of said pair of sights comprises a triangularly shaped member, said triangularly shaped member being opaque, the apex of said triangularly shaped member extending outwardly from said joining member and having a V-shaped notch, said V-shaped notch being non-opaque, the apex of said V-shaped notch being disposed adjacent said joining member, the other of said pair of sights including another V-shaped notch, said another V-shaped notch being non-opaque, the apex of said another V-shaped notch being disposed located adjacent said joining member, said notch and said another notch being disposed along said line.

3. The apparatus as claimed in claim 1 wherein one of said sight locations comprises an opening, a pair of sight wires fixedly secured traversing said opening and extending at right angles to one another, said pair of sight wires traversing one another along said line.

4. The apparatus as claimed in claim 1 wherein said ends of said at least one band extend outwardly from portions of the surface of said at least one band adjacent thereto.

5. The apparatus as claimed in claim 1 wherein said at least one band comprises steel.

6. The apparatus as claimed in claim 1 wherein said at least one band has a curved surface.

* * * * *